United States Patent
Takahashi

(10) Patent No.: US 6,950,425 B2
(45) Date of Patent: Sep. 27, 2005

(54) METHOD OF MANAGEMENT AND CONTROL OF VOICE CALLS AND GATEWAY FOR SAME

(75) Inventor: Yuji Takahashi, Tokyo (JP)

(73) Assignee: Fujitsu Limited, Kawasaki (JP)

(*) Notice: Subject to any disclaimer, the term of this patent is extended or adjusted under 35 U.S.C. 154(b) by 761 days.

(21) Appl. No.: 09/760,581

(22) Filed: Jan. 16, 2001

(65) Prior Publication Data

US 2001/0036190 A1 Nov. 1, 2001

(30) Foreign Application Priority Data

Mar. 31, 2000 (JP) .................................. 2000-099665

(51) Int. Cl.[7] .............................................. H04L 12/66
(52) U.S. Cl. ...................................... 370/352; 370/401
(58) Field of Search ................................ 370/352, 353, 370/354, 355, 356, 400, 401

(56) References Cited

U.S. PATENT DOCUMENTS 6,339,594 B1 * 1/2002 Civanlar et al. ............ 370/352
6,477,164 B1 * 11/2002 Vargo et al. ................ 370/356
6,529,499 B1 * 3/2003 Doshi et al. ................ 370/352
6,584,110 B1 * 6/2003 Mizuta et al. .............. 370/401
6,600,734 B1 * 7/2003 Gernert et al. .............. 370/352
6,600,735 B1 * 7/2003 Iwama et al. ............... 370/352

FOREIGN PATENT DOCUMENTS

JP            06232904           8/1994

\* cited by examiner

*Primary Examiner*—Ricky Ngo
*Assistant Examiner*—Christine Ng
(74) *Attorney, Agent, or Firm*—Katten Muchin Rosenman LLP

(57) ABSTRACT

A method of management and control of voice calls and a gateway for the same designed to maintain a real-time characteristic of speech and a constant quality of speech comprising a first step of discriminating whether or not an input packet is a voice call packet, a second step of deciding, when discriminating that the packet is a voice call packet, whether or not the voice call packet can be carried over the transmission path based on both an available band provided in the transmission path and a required band for the voice call packet, and a third step of transferring the voice call packet only when it is decided that it can be carried.

13 Claims, 16 Drawing Sheets

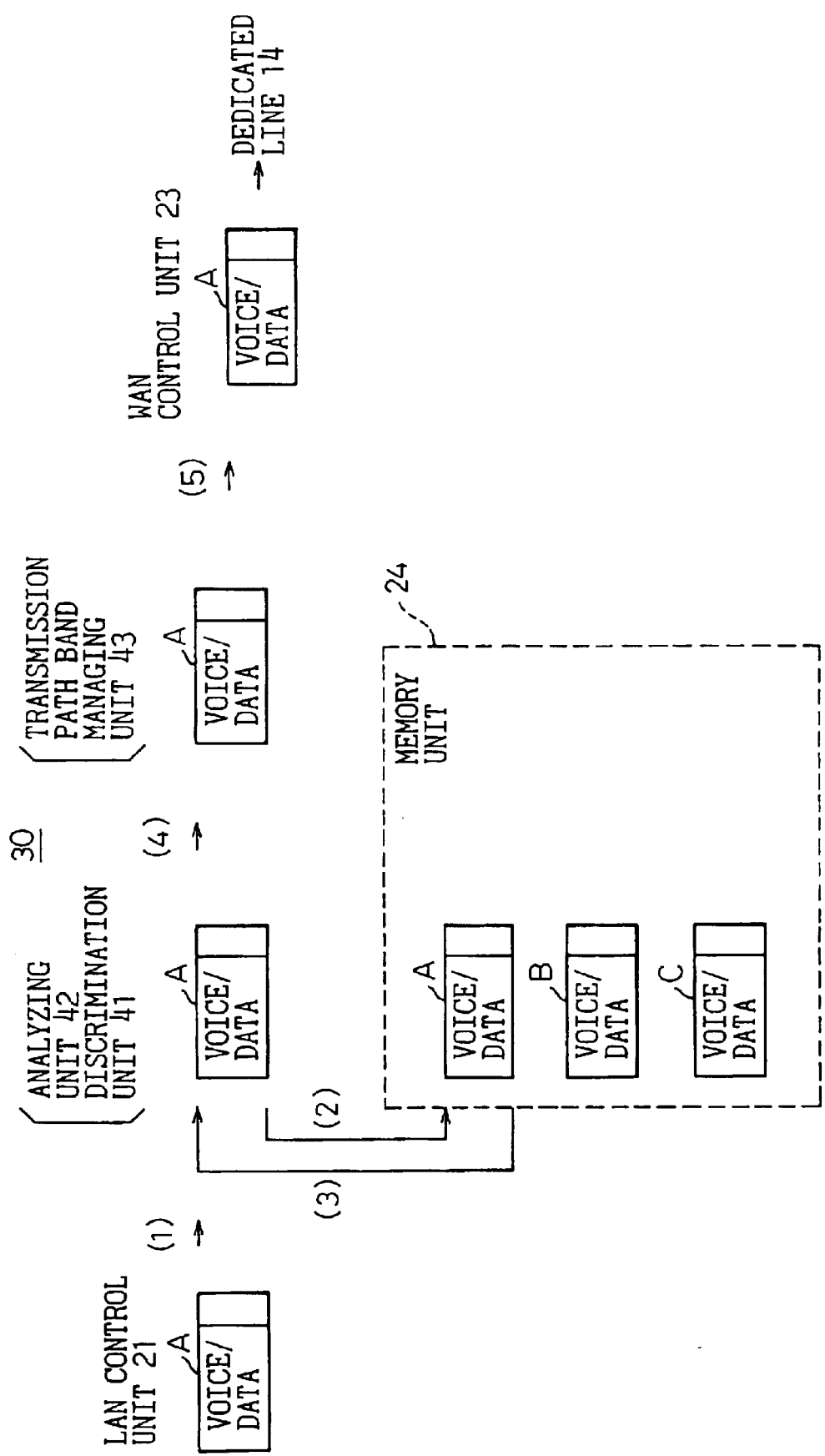

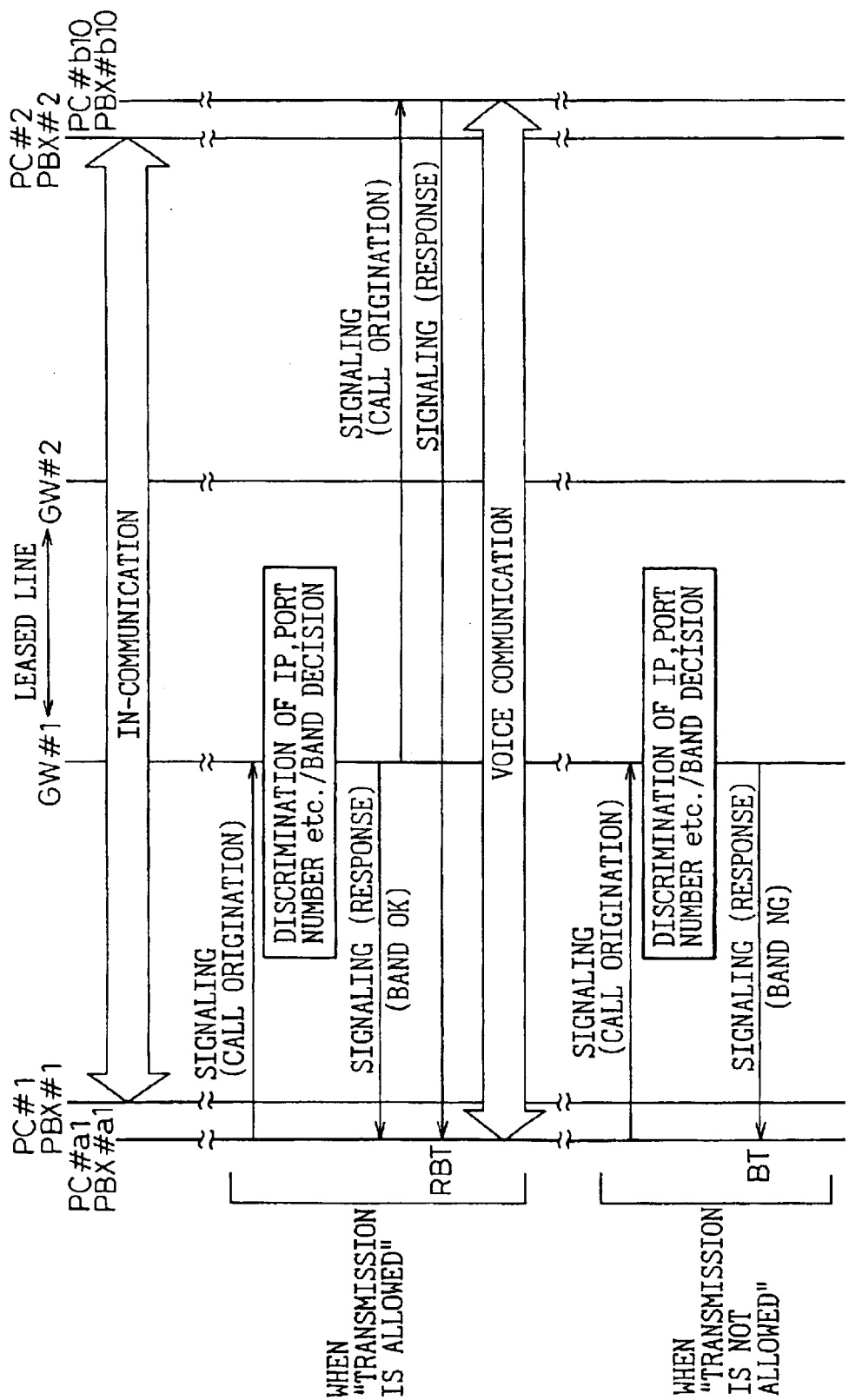

METHOD OF MANAGEMENT AND CONTROL OF VOICE CALLS AND GATEWAY FOR SAME

BACKGROUND OF THE INVENTION

1. Field of the Invention

The present invention relates to a method of management and control of voice calls and a gateway used for that method.

In communication over conventional voice-based networks, voice information is transferred over a specific line switching route. A telephone switching network is a typical example of this.

This type of communication is optimal for applications requiring a real-time characteristic such as speech and is effective when the quality of speech is considered important.

On the other hand, as a network of a form different from a voice-based network such as a telephone switching network, there is a data-based network as represented by the Internet and intranets. Communication over a data-based network, as compared with communication over a voice-based network, is effective when thinking of importance to transmitting as large an amount of data as possible and to how to optimize transmission routes and increase efficiency. The most widely utilized network based on this method is the Internet Protocol (IP) network.

Up until now, voice-based networks and data-based networks have been operated by different communication methods from each other, but recently techniques for merging these communication methods have started to be established. For example, Voice over FR (VoFR), Voice over ATM (VoATM), and Voice over IP (VOIP) are well known as such techniques. Among these, VOIP is particularly attracting attention.

The reasons for this are that, first, the environment of the IP network has been improved due to the general spread of personal computers (PC) and application software and to the spread of the Internet using PCs and the application software and, second, communications costs have been greatly reduced through the integration of data and voice by IP networks.

Therefore, construction of VoIP-based unified networks is proceeding at a fast pace at the present time. Under the above circumstances, the present invention relates to a method for management and control of voice calls effective when applied to an IP network.

2. Description of the Related Art

As will be explained in detail later by using the drawings, during voice communication between a telephone set #1 and a telephone set #2 via a gateway over a dedicated line and a gateway of the other party, the problem arises that a real-time characteristic and a constant quality of speech can no longer be maintained since there is a time lag in the conversation or the conversation breaks up due to a delay of the voice call packets or packet loss and therefore a normal state of conversation cannot be achieved.

Usually, the emphasis in technical innovation in a unified network has been on how to use transmission lines more efficiently. An one example, a good state of communication over an IP network is being secured by band securing techniques such as RSVP (IntServ) or Diff Serv.

Depending on the network environment, however, there are many cases where the above band securing technique cannot be used. This is because all of the gateways, including routers, in the IP network have to have this band securing function. In the Internet etc., how and in what manner voice packets are routed is unknown. Therefore the above problem occurs.

Further, in VoIP-based communications, sometimes the communication is routed through a gatekeeper for managing calls. From the viewpoint of management of only voice calls, the state of the IP network can be monitored, but there are not many gatekeepers managing even data calls as well. Further, even if there were such a gatekeeper, communication using such a gatekeeper is not required in the standards and specifications, so the above problem again occurs.

SUMMARY OF THE INVENTION

An object of the present invention is to provide, in view of the above problem, a method of management and control of voice calls designed to maintain a real-time characteristic of speech and a constant quality of speech and a gateway for working that method.

To attain the above object, the method according to the present invention comprises a first step of discriminating whether or not an input packet is a voice call packet, a second step of deciding whether or not the voice call packet can be carried over the transmission path based on an available communication band provided in the transmission path and a required communication band for the voice call packet when discriminating that the packet is a voice call packet, and a third step of transferring the voice call packet only when it is decided that it can be carried.

Due to this, in an integrated voice and data-based service IP network, it is possible to prevent the state of communication from degrading by the failure of maintaining the real-time characteristic or a constant quality of speech after the start of the communication and thereby provide an agreeable speech service to the end user.

BRIEF DESCRIPTION OF THE DRAWINGS

The above object and features of the present invention will be more apparent from the following description of the preferred embodiments given with reference to the accompanying drawings, wherein:

FIG. 12 is a view diagrammatically representing motion and processing of a packet in FIG. 4;

FIG. 13 is a view of a communication sequence realized in FIG. 3;

DESCRIPTION OF THE PREFERRED EMBODIMENTS

Before describing the embodiments of the present invention, the related art and the disadvantages therein will be described with reference to the related figures.

Figure 14A:
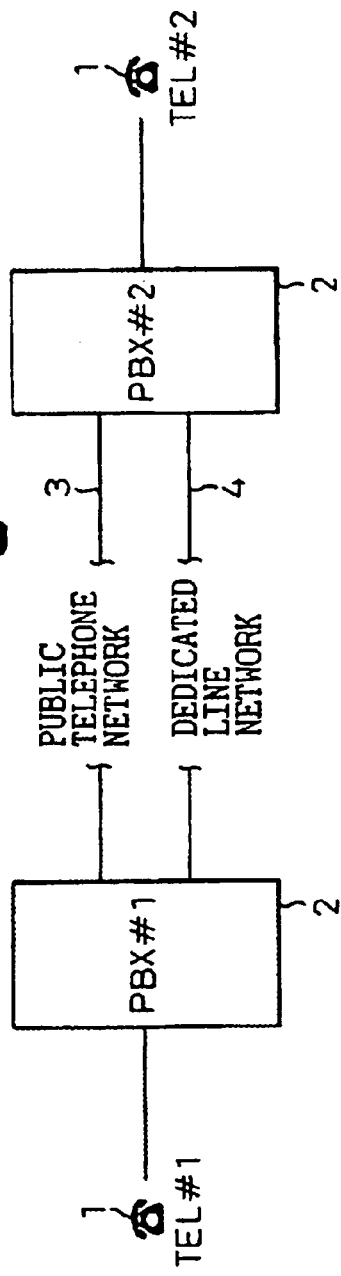
FIG. 14a is a view of the system configuration of a general voice-based network.
Figure 14B:
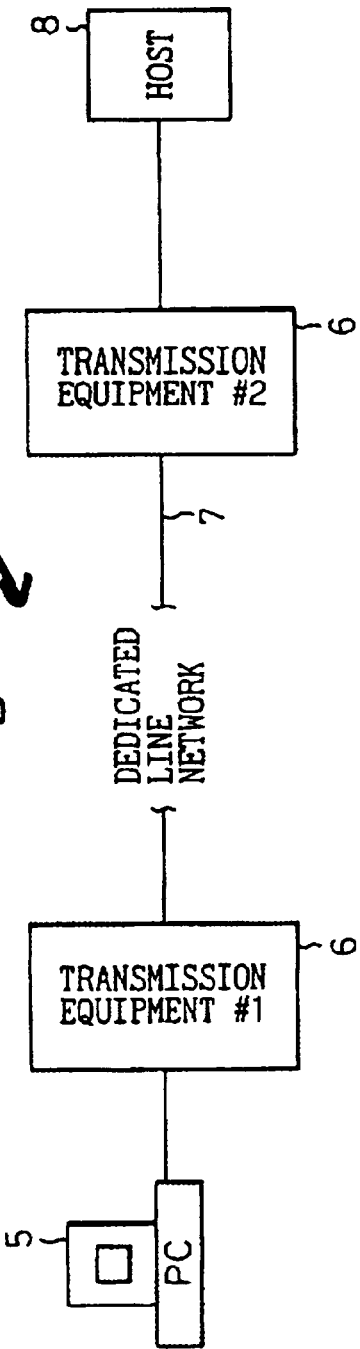
FIG. 14b is a view of the system configuration of a general data-based network.

FIG. 14a is a view of the system configuration of a general voice-based network, and FIG. 14b is a view of the system configuration of a general data-based network.

In the general voice-based network of FIG. 14a, a private branch exchange (PBX) 2 (#1) accommodating a telephone set 1 (#1) and a PBX 2 (#2) similarly accommodating a telephone set 1 (#2) are connected via a public telephone line network 3 or a dedicated line network 4. Voice communication is carried out between the telephone set 1 (#1) and the telephone set 1 (#2).

On the other hand, in the general data-based network of FIG. 14b, transmission equipment 6 (#1) accommodating a PC 5 and transmission equipment 6 (#2) accommodating a host 8 are connected via a dedicated line network 7. Data communication is carried out between the PC 5 and the host 8.

In this way, conventionally, a voice-based network (telephone switching network) and a data-based network (IP network) have existed separately.

Along with the development of VOIP, however, the technology for transmitting voice information over IP packets has been developed. The above voice-based and data-based networks have therefore been integrated into one and broad, unified networks have been constructed.

Figure 15:
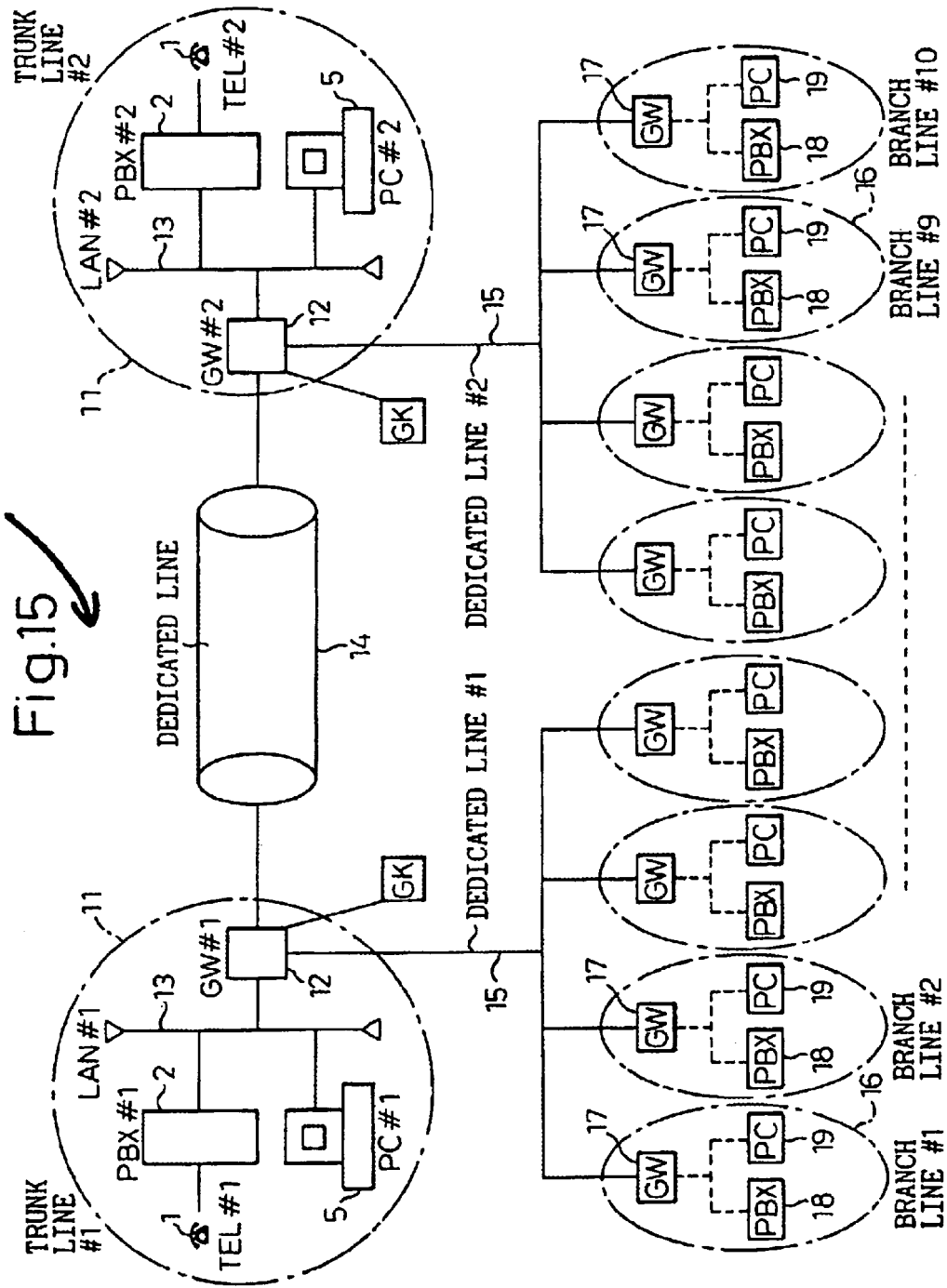
FIG. 15 is a view of an example of the configuration of a general VoIP-based IP network.

FIG. 15 is a view of an example of the configuration of a general VoIP-based IP network. Note that, throughout the drawings, the same reference numerals or symbols are attached to similar components.

In the figure, 11#1 is one trunk line system (for example, a head office located in the Tokyo area), while 11#2 is another trunk line system (for example, a head office located in the Osaka area). These trunk line systems 11#1 and 11#2 are linked via gateways (GW) 12#1 and 12#2 by a large capacity dedicated line 14.

One trunk line system 11#1 and branch line systems 16 (#1, #2, . . . ) served by that are linked via the gateways (GW) 12#1 and 17 by a dedicated line 15#1.

Similarly, the other trunk line system 11#2 and branch line systems 16 (. . . , #9, #10) accommodated by the system 11#2 are linked via the gateways (GW) 12#2 and 17 by a dedicated line 15#2.

In the trunk line system 11#1, the PBX 2#1 accommodating the telephone set 1#1, PC 5#1, and gateway (GW) 12#1 are linked by a local area network (LAN) 13#1.

In the trunk line system 11#2, similarly, the PBX 2#2 accommodating the telephone set 1#2, PC 5#2, and gateway (GW) 12#2 are linked by a LAN 13#2.

The branch line systems 16 (#1, #2, . . . , #9, #10) basically have the same configurations as the trunk line systems 11#1 and 11#2. The gateways (GW) 17, PBXs 18, and PCs 19 are linked by the LANs (shown by dotted lines).

In an IP network providing both voice service and data service by VOIP, one example of the configuration of which is shown in FIG. 15, the gateways (GW) 12 of the trunk line systems 11 and the gateways (GW) 17 of the branch line systems 16 are closely related to the method of management and control of voice calls according to the present invention. Note that, the following explanation will be given by paying attention mainly to the gateways of the trunk line systems, but the gateways of the branch line systems can be considered in the same way.

Figure 16:
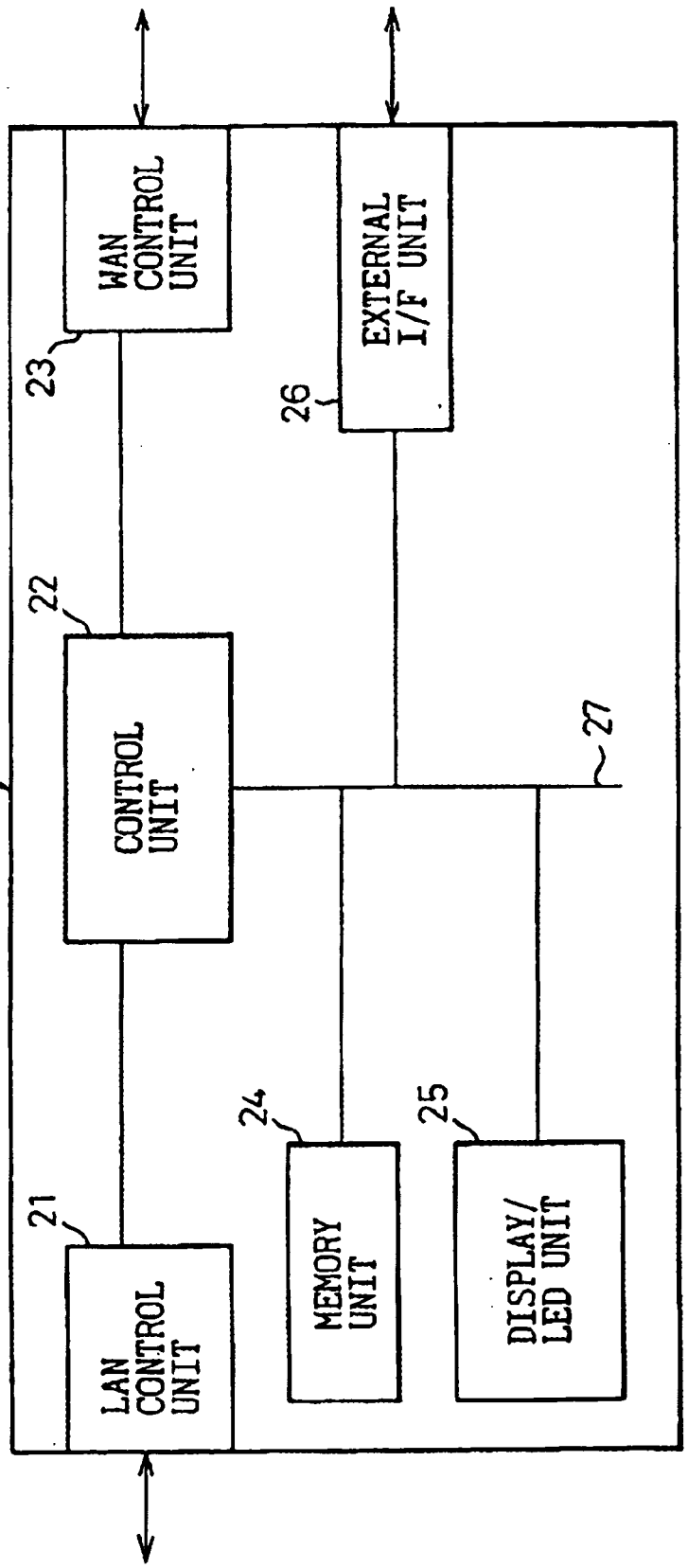
FIG. 16 is a view of an example of the configuration of a general gateway.

FIG. 16 is a view of an example of the configuration of a general gateway.

A conventional general gateway 20 comprises a LAN control unit 21 for controlling the LAN (13 in FIG. 15), a wide area network (WAN) control unit 23 for line control for receiving service by the dedicated line 14 with the other gateway, a memory unit 24 for storing required various types of data, including programs, a display/LED unit 25 for presenting a variety of service menus and displaying various types of fault information, an external interface (I/F) unit 26 set with various types of parameters (office data etc.) with respect to the gateway 20 from an external PC via for example an RS232C port, and a control unit 22 including a CPU for overseeing control of the apparatus 20 as a whole via a common bus 27.

As explained earlier, during voice communication between, e.g., a telephone set 1#1 and a telephone set 1#2 via a gateway 20 over a dedicated line 14 and a gateway of the other party, the problem arises that a real-time characteristic and a constant quality of speech can no longer be maintained since there is a time lag in the conversation or the conversation breaks up due to a delay of the voice call packets or packet loss and therefore a normal state of conversation cannot be achieved.

Usually, the emphasis in technical innovation in an integrated network has been on how to use transmission lines more efficiently. An one example, a good state of communication over an IP network is being secured by band securing techniques such as RSVP (IntServ) or Diff Serv.

Depending on the network environment, however, there are many cases where the above band securing technique cannot be used. This is because all of the gateways, including routers, in the IP network have to have this band securing function. In the Internet etc., how and in what manner voice packets are routed is unknown. Therefore the above problem occurs.

Further, in VoIP-based communications, sometimes the communication is routed through a gatekeeper for managing calls (see GK in FIG. 15). From the viewpoint of management of only voice calls, the state of the IP network can be monitored, but there are not many gatekeepers managing even data calls as well. Further, even if there were such a gatekeeper, communication using such a gatekeeper is not required in the standards and specifications, so the above problem again occurs.

The present invention solves this problem and provides a method of management and control of voice calls designed to maintain a real-time characteristic of speech and a constant quality of speech and a gateway for working that method. This will be explained in further detail below.

In a VoIP-based integrated voice and data service network, frequently the real-time characteristic of speech and a constant quality of speech cannot be maintained due to the delay of the voice call packets and packet loss. Analysis of the causes revealed the following phenomenon.

When transmitting voice call packets from one gateway 12#1 (FIG. 15) in the unified network to another gateway 12#2, two successive routines are required. The first routine transmits the voice call packet carrying the signaling information so as to establish the communication. When the transmission path is set by this, the second routine starts. This second routine transmits the voice call packets carrying the inherent voice information via the thus set transmission path. The conversation state is then started.

The first and second routines both succeed when the required band of the voice call packets is smaller than the available band of the transmission path. Accordingly, the conversation state is reached without problem and that conversation state can be maintained normally.

Conversely, the first and second routines both fail when the required band of the voice call packets is larger than the available band. Accordingly, a transmission path cannot be established and the conversation state cannot be reached.

The problem is that even when the first routine succeeds, the second routine sometimes does not succeed. The cause is the unbalance between the required band of the voice call packet carrying the signaling information and the required band of the voice call packets carrying the voice information. Namely, the band required for the packet transmission of the signaling information is smaller than the band required for the packet transmission of the voice information. Experience shows that the ratio of these required bands is 1.5 to 2 versus 1.

This being so, due to the difference of these required bands, sometimes the second routine does not succeed even though the first routine succeeds. In such a case, the signaling information reaches the terminating side through the communications protocol. So long as the connection negotiation after that is completed, communication is established and the speech state is reached.

In this case, the communication state was reached by the signaling information with the small required band despite there being no extra leeway in the available band. Therefore the communication band is already insufficient for voice information with its large required band. In the end, a normal conversation state cannot be maintained. As a result, the real-time characteristic and constant quality of speech are lost. The present invention was made by taking note of the result of this analysis.

Figure 1:
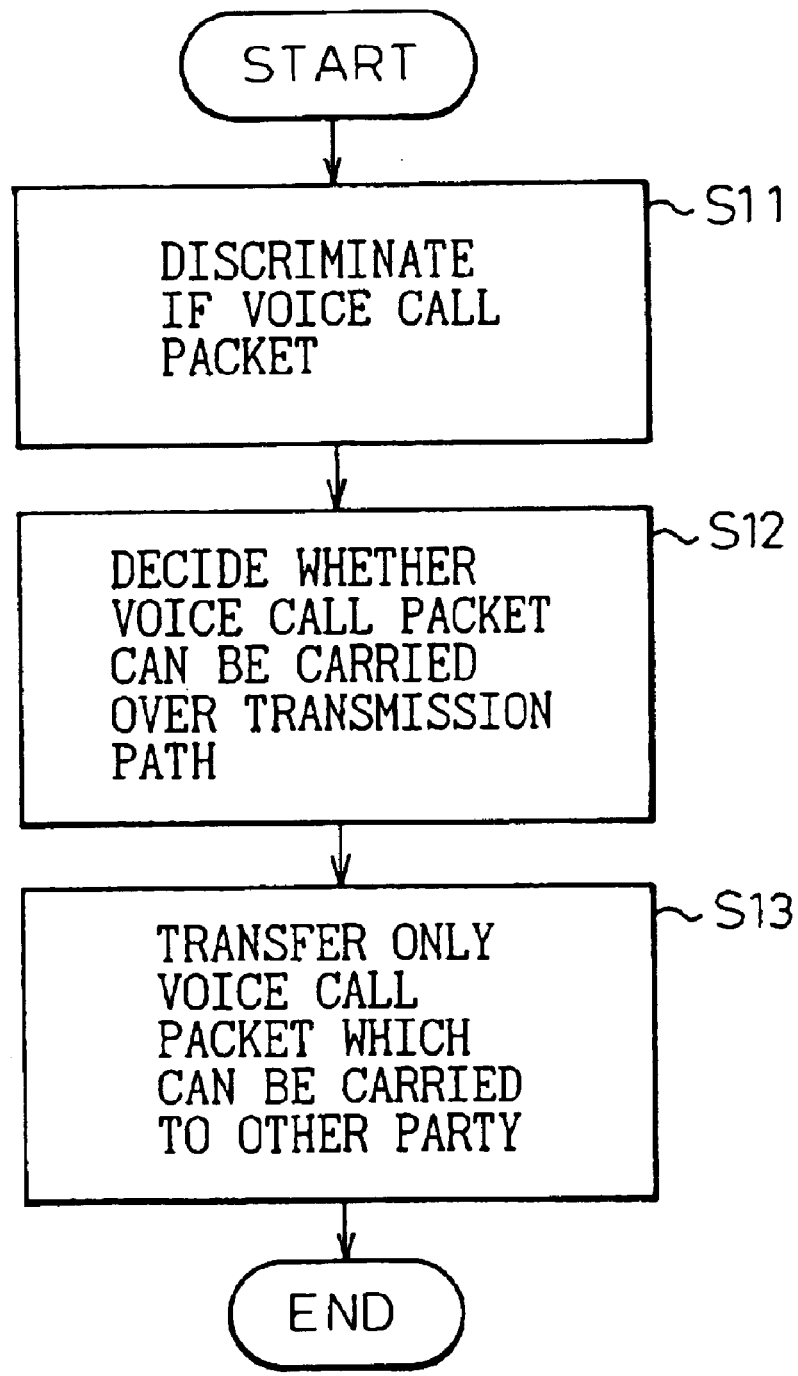
FIG. 1 is a flow chart of fundamental steps of a method according to the present invention.

FIG. 1 is a flow chart of the fundamental steps of the method according to the present invention.

The method of management and control of voice calls according to the present invention, used in an integrated voice and data service network, comprises the first, second, and third steps (S11, S12, and S13) shown in FIG. 1.

First step S11: It is discriminated whether or not a packet input to the first gateway 12#1 in the integrated network is a voice call packet.

Second step S12: When it is discriminated that the packet is a voice call packet in the first step S11, it is decided whether or not the related voice call packet can be carried over the transmission path based on both the available band in the transmission path to the opposing second gateway 12#2 and the required band of the related voice call packet.

Third step S13: The voice call packet is transferred to the second gateway only when it is decided that it can be carried.

Figure 2:
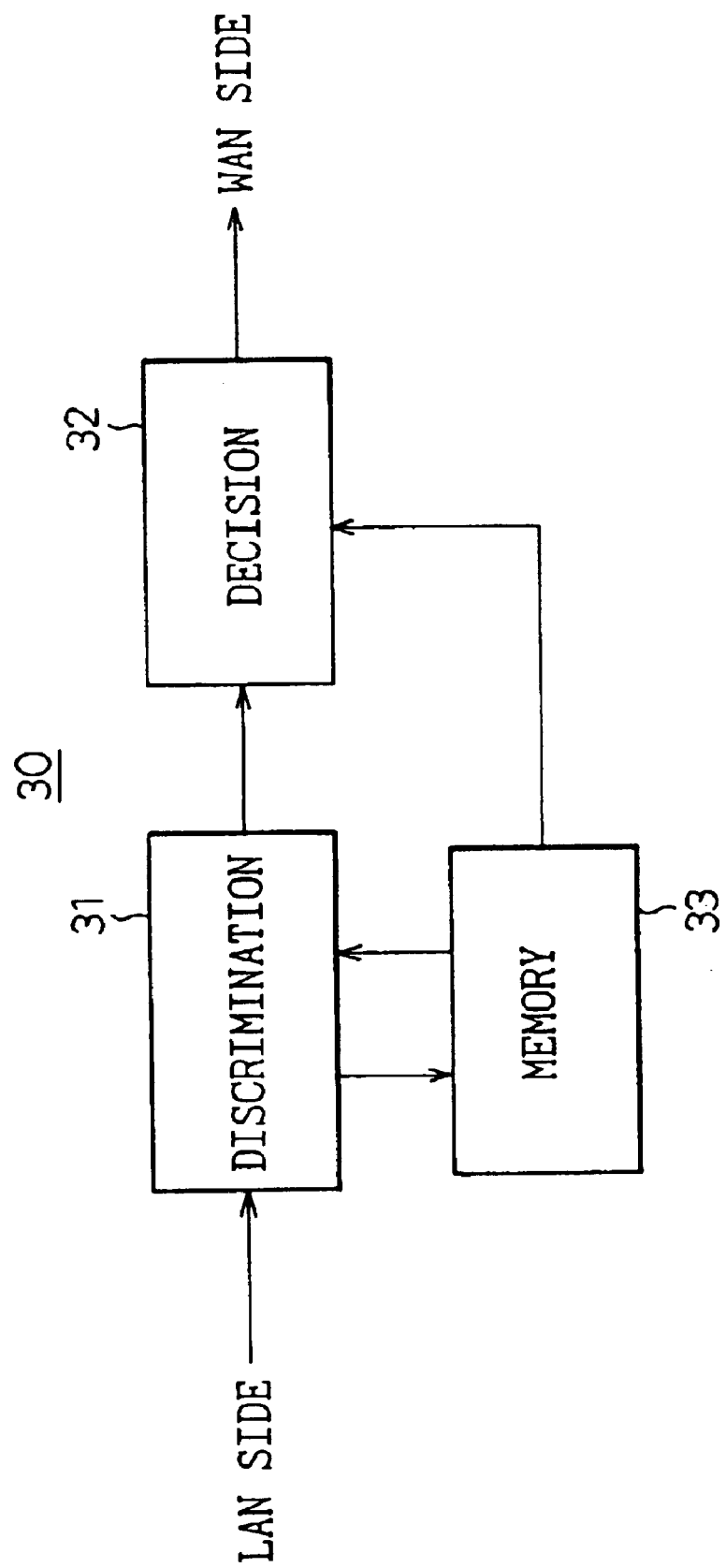
FIG. 2 is a view of the basic configuration of a gateway according to the present invention.

FIG. 2 is a view of the basic configuration of a gateway according to the present invention. The steps S11 to S13 of FIG. 1 can be executed by a gateway 30 of FIG. 2.

Referring to FIG. 2, the gateway 30 according to the present invention in the integrated voice and data service network has at least the illustrated discriminating means 31 and deciding means 32. Preferably it further has a memory means 33. Note that the gateway 30 of FIG. 2 corresponds to the gateway 20 of FIG. 16. In FIG. 2, however, only means (31, 32, and 33) characterizing the present invention are indicated. These discriminating means 31 and deciding means 32 can be realized by software in the control unit 22 of FIG. 16. Further, the memory means 33 can be formed as the memory unit 24 of FIG. 16.

Specifically, the discriminating means 31 discriminates whether or not a packet input to the gateway 12#1 is a voice call packet.

Further, when the discriminating means 31 discriminates that the packet is a voice call packet, the deciding means 32 decides whether or not the voice call packet can be carried over the transmission path based on both the communication band of the transmission path to the opposing other gateway 12#2 and the required band of the voice call packet.

Further, the memory means 33 holds predetermined parameters referred to for the discrimination by the discriminating means 31 and/or the decision by the deciding means 32.

Accordingly, referring to FIG. 1 again, the first or second step (S11, S12) is executed by referring to the predetermined parameters held in the memory means 33 in the first gateway 12#1.

Figure 3:
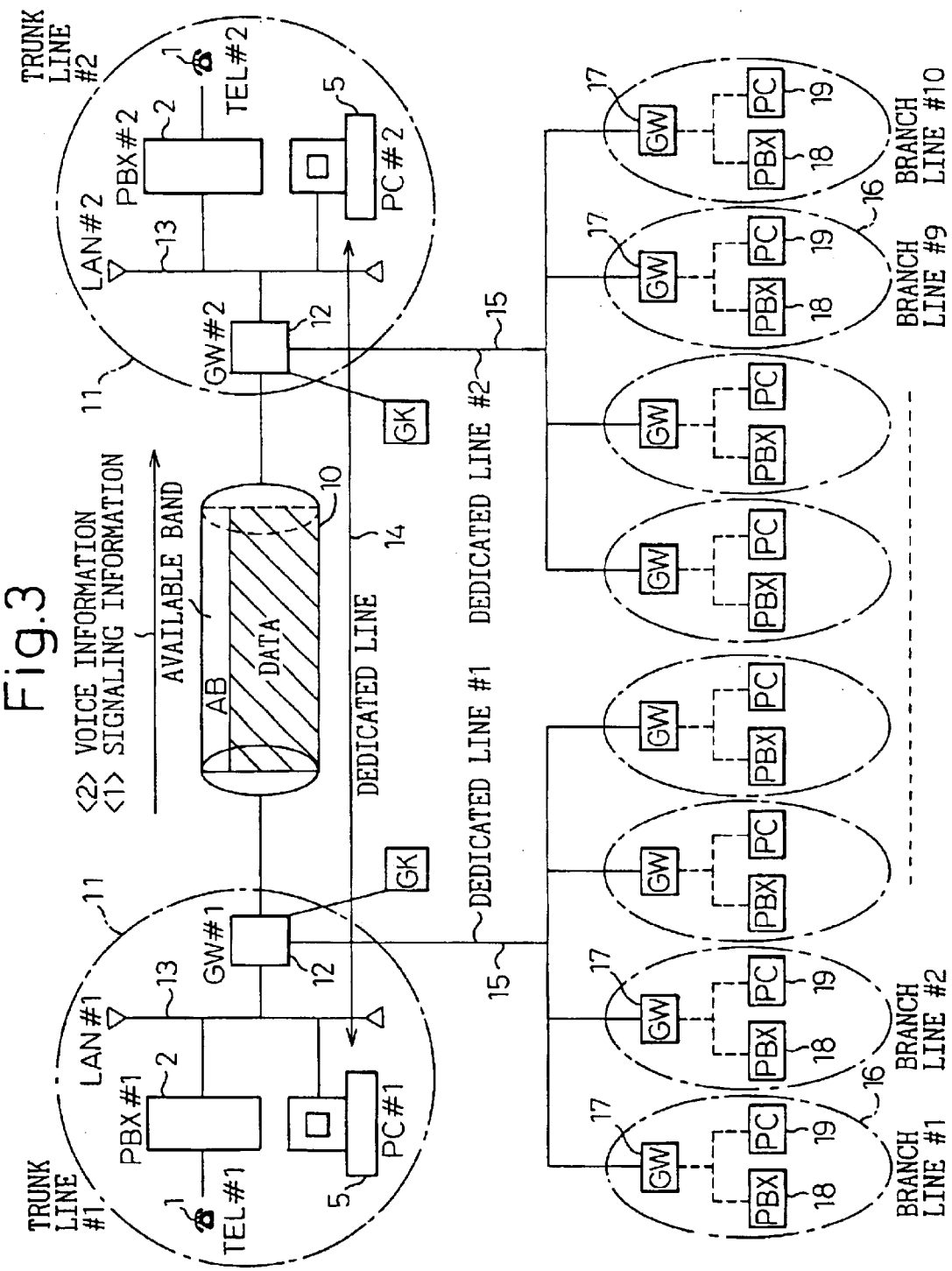
FIG. 3 is a view of an example of the configuration of an integrated network to which the present invention is applied.

FIG. 3 is a view of an example of the configuration of the integrated network to which the present invention is applied. Note that the configuration is substantially the same as the configuration of the IP network shown in FIG. 15. The difference from FIG. 15 resides in the point that the portion of the dedicated line 14 between the first gateway (GW) 12#1 and the second gateway (GW) 12#2 is schematically drawn.

Namely, the transmission path formed on the dedicated line 14 is represented by a pipe (communication band) shown by reference numeral 10. The portion of the pipe occupied by data (including both voice and data) is represented by hatching. In the example of this figure, the maximum allowable communication band has not been completely used up and there is an available band (AB) exists.

When a voice call packet newly occurs in the trunk line system 11#1 (or a branch line system 16 under the trunk line system 11#1), the gateway (GW) 11#1 first discriminates whether or not the input packet is a voice call packet. In this case, the packet is a voice call packet.

After this is discriminated, the gateway (GW) 11#1 decides whether or not the signaling information input first (<1>in the figure) can be carried over the available band AB on the transmission path 10. When it is seen by this decision that it can be carried, it decides whether or not the voice information input next can similarly be carried over the available band AB. When it is seen by this decision that it can be carried, a speech path is established between the gateways (11#1, 11#2), and the conversation state is entered.

Figure 4:
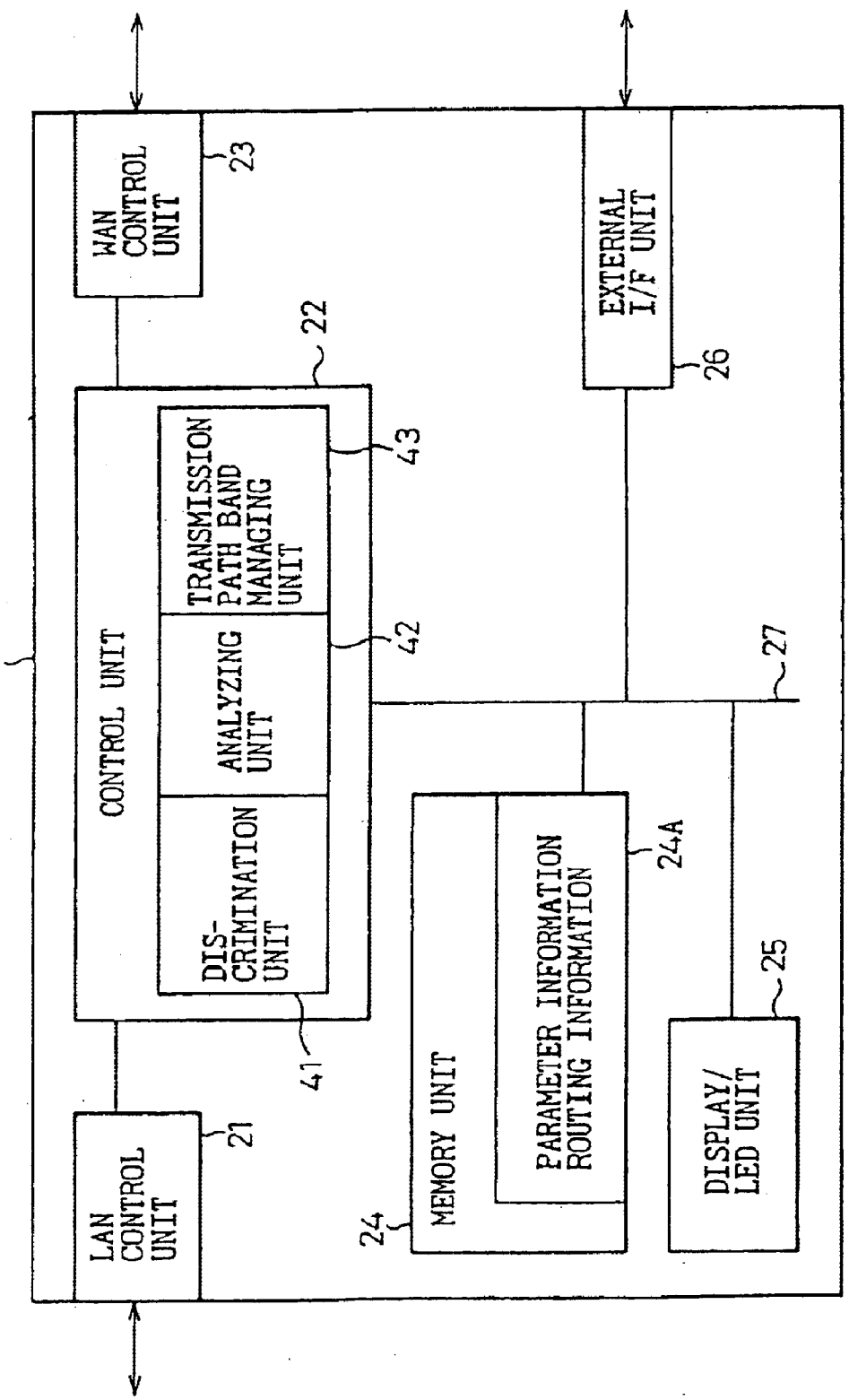
FIG. 4 is a view of an example of the concrete configuration of a gateway 30.

FIG. 4 is a view of a concrete example of the configuration of the gateway 30.

As shown in the figure, the basic block configuration is no different from the configuration shown in FIG. 16, but the internal configuration of the control unit 22 is altered. Namely, a discrimination unit 41 and an analyzing unit 42 are formed as the discriminating means 31 of FIG. 2, and a transmission path band managing unit 43 is formed as the deciding means 32 of FIG. 2. Also, parameter information and routing information 24A are further held in the memory unit 24. This becomes the memory means 33 of FIG. 2.

Figure 5:
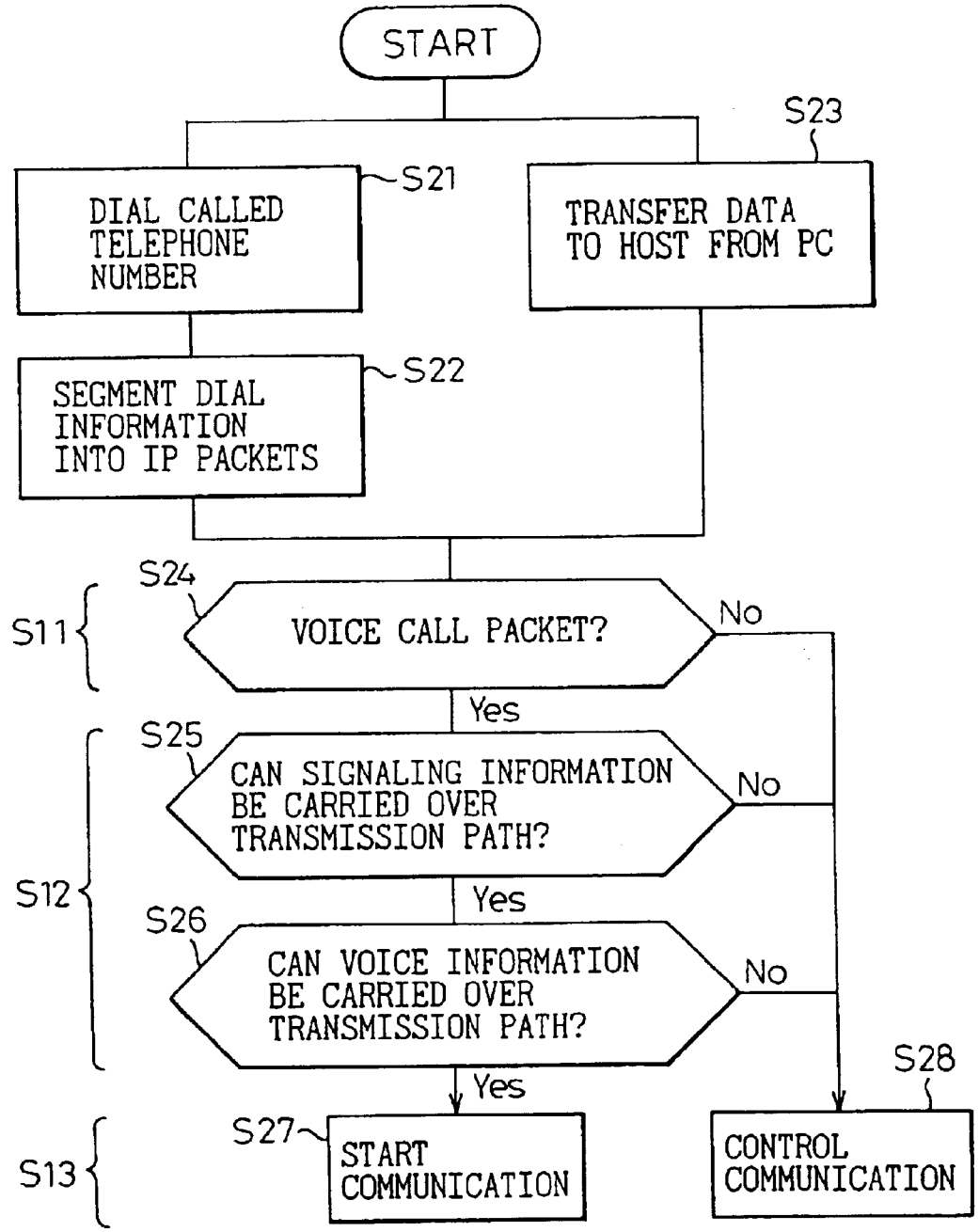
FIG. 5 is a flow chart of the principal steps executed by the gateway of the present invention and steps related to them.

FIG. 5 is a flow chart of the principal steps executed by the gateway of the present invention and the steps in relation to them.

In the figure, steps S11, S12, and S13 correspond to S11, S12, and S13 shown in FIG. 1.

Step S21: A user dials a number of another party by the telephone set 1 in the trunk line system (or the branch line system).

Step S22: The dial information is segmented into IP packets in the corresponding PBX 2 (or input stage of the gateway 30).

Step S23: The other user transfers the data from the PC 5 to the host 8 (FIG. 14). This data is also segmented into IP packets.

By these steps, the IP packet input to the gateway 30 first enters step S24.

Step S24: The discrimination unit 41 of FIG. 4 discriminates whether or not the input IP packet is a voice call packet.

At step S24, the parameter information held in the memory unit 24 is referred to. A "parameter" is an element of information described in a header portion of the input packet and indicates an attribute etc. of the packet. The most important element is the information indicating whether or not the packet is a voice call packet.

Specifically, the parameters include at least one of an IP source address, TCP/IP, RTP, UDP port numbers, and a TOS value of the packet input to the gateway 30. Step S24 is executed based on these parameters. The memory unit 24 preferably holds all of these parameters. Here, TCP/IP means a transmission control protocol/internet protocol, RTP means a real-time transfer protocol, UDP means a user datagram protocol, and TOS means a time of service—all of which are well known.

As the parameter information in the memory unit 24, the specific IP source address indicating the voice call packet, TCP/IP, RTP, etc. are described. If there is an input packet matching with any of these parameters, this is discriminated as a voice call packet. In FIG. 5, Step S25: Whether or not the signaling information can be carried over the transmission path 10 is decided based on the required band of the voice call packet, discriminated at step S24, carrying the signaling information.

Step S26: When it is decided that it can be carried, whether or not this voice information can be carried over the transmission path 10 is decided based on the required band of the voice call packets carrying the voice information.

Step S27: When both of results of steps S25 and S26 are yes, the speech state is achieved. At this time, it is possible to converse with another party while maintaining a real-time characteristic and constant quality of speech.

Step S24 (discrimination) will be considered in a little more detail again. The parameters used when discriminating a packet are input in advance for holding in the memory unit 24. They may be input from an external interface unit 26.

S28: If the result of step S24 is No, the received packet is not a "voice call packet", but a "dats packet", and therefore the voice call control according to the present invention is not applied to that packet. Also, if the result of step S25 or S26 is No, communication control is achieved so as not to transmit the received voice call packet.

However, not all of the input voice call packets always match with the parameters held in the memory unit 24.

Namely, there may be a parameter unregistered in the memory unit 24 too. A decision cannot be made, at the following steps S25 and S26, for a voice call packet having such an unregistered parameter, so the effects according to the present invention cannot be obtained.

Therefore, when a packet having a parameter unregistered in the memory unit 24 appears, this packet is analyzed at the analyzing unit 42. By this analysis, when it is found that this is a voice call packet, the related parameter is registered in the memory unit 24 and the parameter information is increased. Namely, the analyzing unit 42 forming the discriminating means 31 finds the parameter used for the above discrimination by analyzing the information element of the voice call packet when the voice call packet passes through the gateway 30 and stores and holds the parameter in the memory unit 24 forming the aforesaid memory means.

By this, when that voice call packet is input to the gateway 30 the next time, it is recognized as a voice call packet by the discrimination of step S24 and a decision can be made at the following steps S25 and S26.

As the information element to be analyzed by the analyzing unit 42, there is for example a "packet length" of the voice call packet. When detecting that the packet has a predetermined packet length, the unit 42 further adds this to the memory unit 24 as the parameter for storage in the memory unit 24.

Turning to step S26, as the parameter used for the decision of whether or not the voice information can be carried over the transmission path, use can be made of for example communication throughput information of the voice call packet. Step S26 can be executed based on this parameter.

Figure 6:
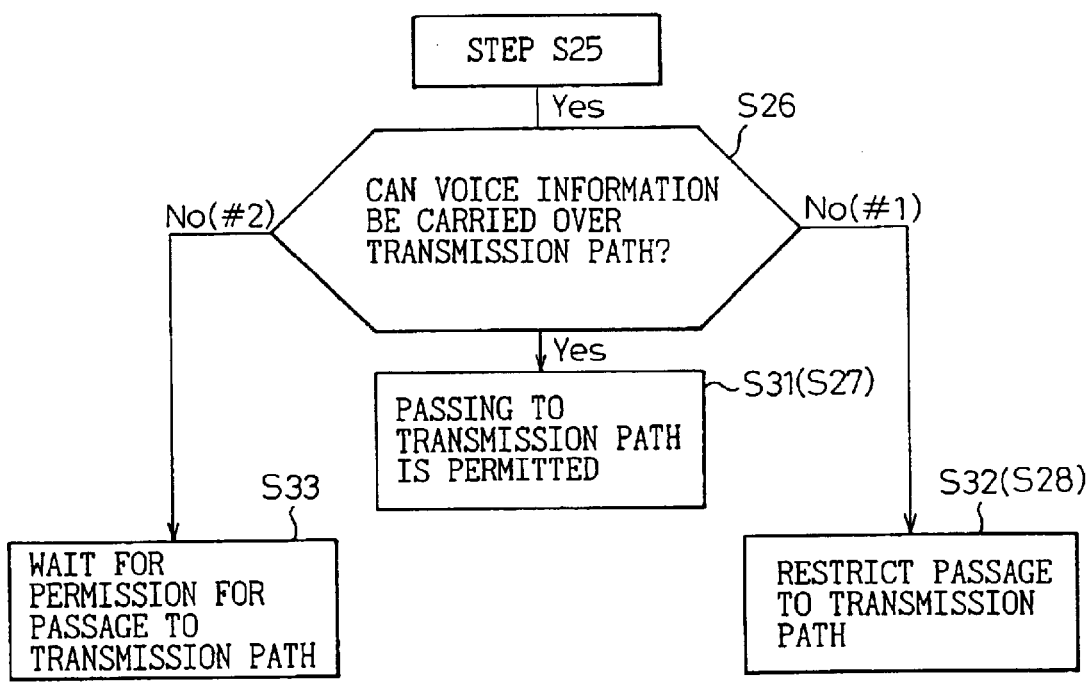
FIG. 6 is a view of a modification of step S26 of FIG. 5.

FIG. 6 is a view of a modification of step S26 of FIG. 5.

As shown in the figure, the decision made at step S26 is one of the following three steps:

Step S31: Whether to permit passage of the voice call packet to the transmission path 10, Step S32: Whether to restrict that passage, or Step S33: Whether to wait for permission for passage.

Steps S31 and S32 correspond to steps S27 and S28 of FIG. 5, therefore step S33 is the new step. A new service can be provided to the user by utilizing this step S33. This is shown in FIG. 7.

Figure 7:
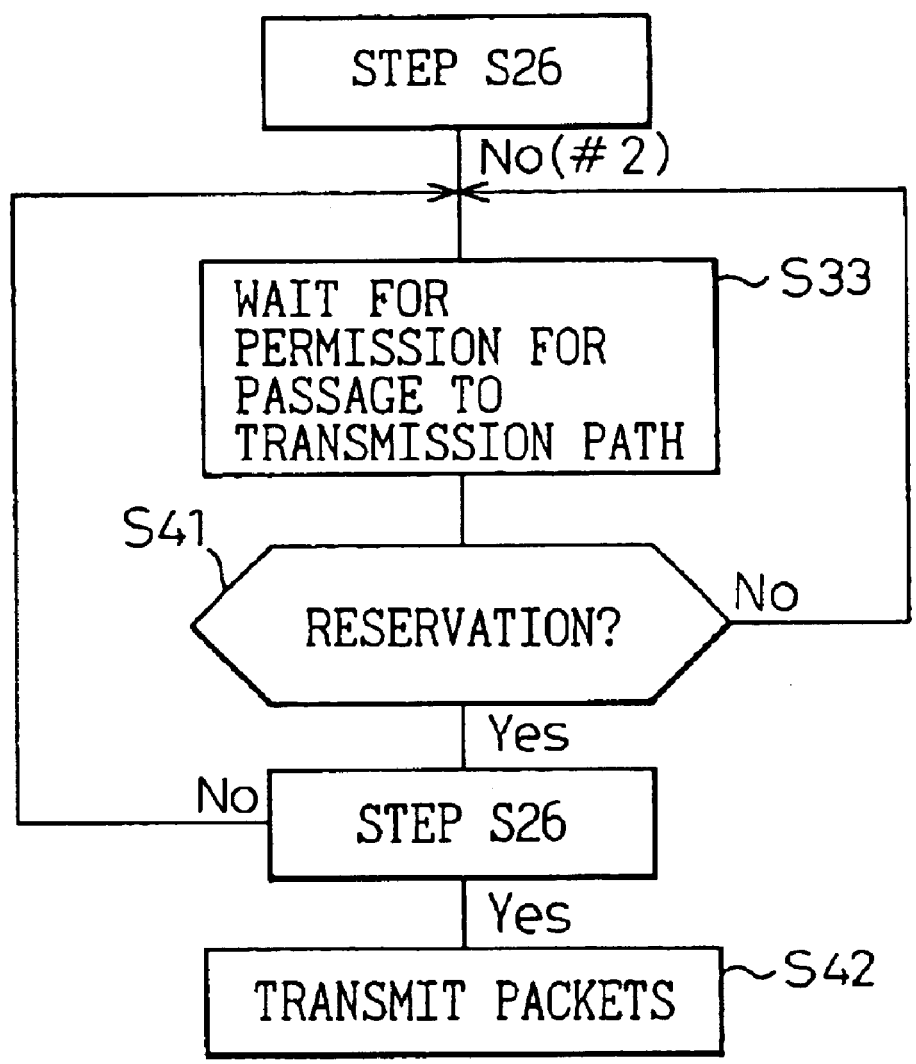
FIG. 7 is a view of an example of application of step S33 of FIG. 6.

FIG. 7 is a view of an example of application of step S33 of FIG. 6.

According to FIG. 7, there is further the step S41 of reserving communication. When the decision at step S26 is the decision to wait for permission of passage to the transmission path 10 (step S33), communication is reserved. The voice call packet is transmitted (step S42) simultaneously with permission of passage is issued (yes at step S26).

Sometimes the user wants to call immediately after congestion of traffic ends. To meet with this desire, it is possible to reserve communication. When there is a reservation, the waiting voice call packet can start to be transmitted immediately after the issuance of the permission of passage at step S26. Note that this reservation is made to the gateway 30 by operation from a user. Existence of a reservation may be temporarily stored in the memory unit 24.

Above, the description was made of a method for management and control of voice calls and a gateway according to the present invention. Next, a detailed example relating to the above explanation will be explained.

Figure 8:
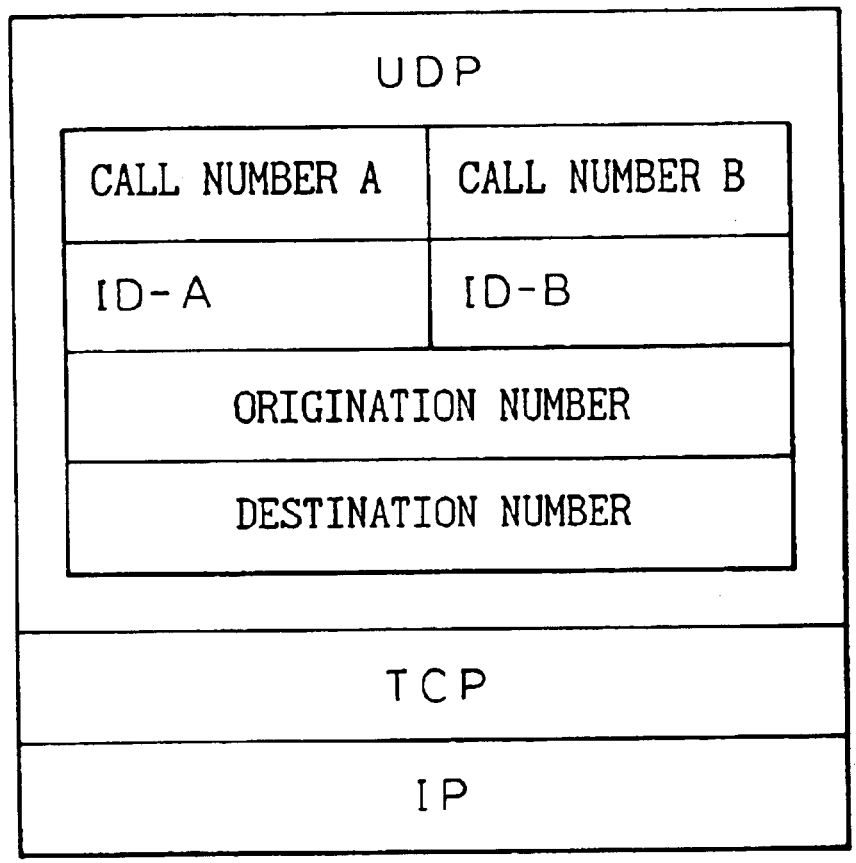
FIG. 8 is a view of a detailed example of signaling information.

FIG. 8 is a view of a detailed example of the signaling information.

Namely, it shows the field of the IP packet (voice call packet) at the time of transmission of the signaling information as an example.

IP in the figure corresponds to the lowest level layer, TCP corresponds to the layer above that, and UDP corresponds to the layer further over that. This will be shown in FIG. 9 to FIG. 11 in further detail.

Figure 9:
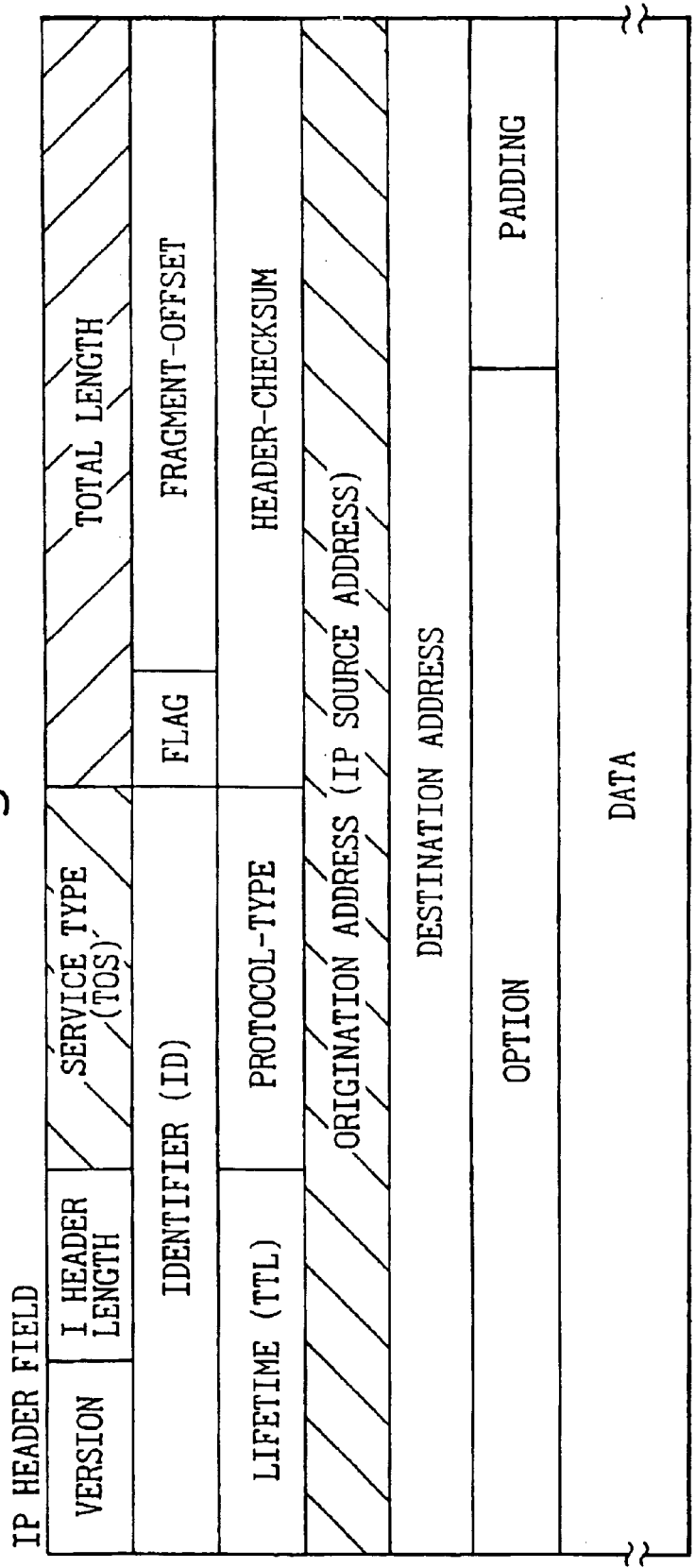
FIG. 9 is a view of a detailed example of an IP header field.
Figure 10:
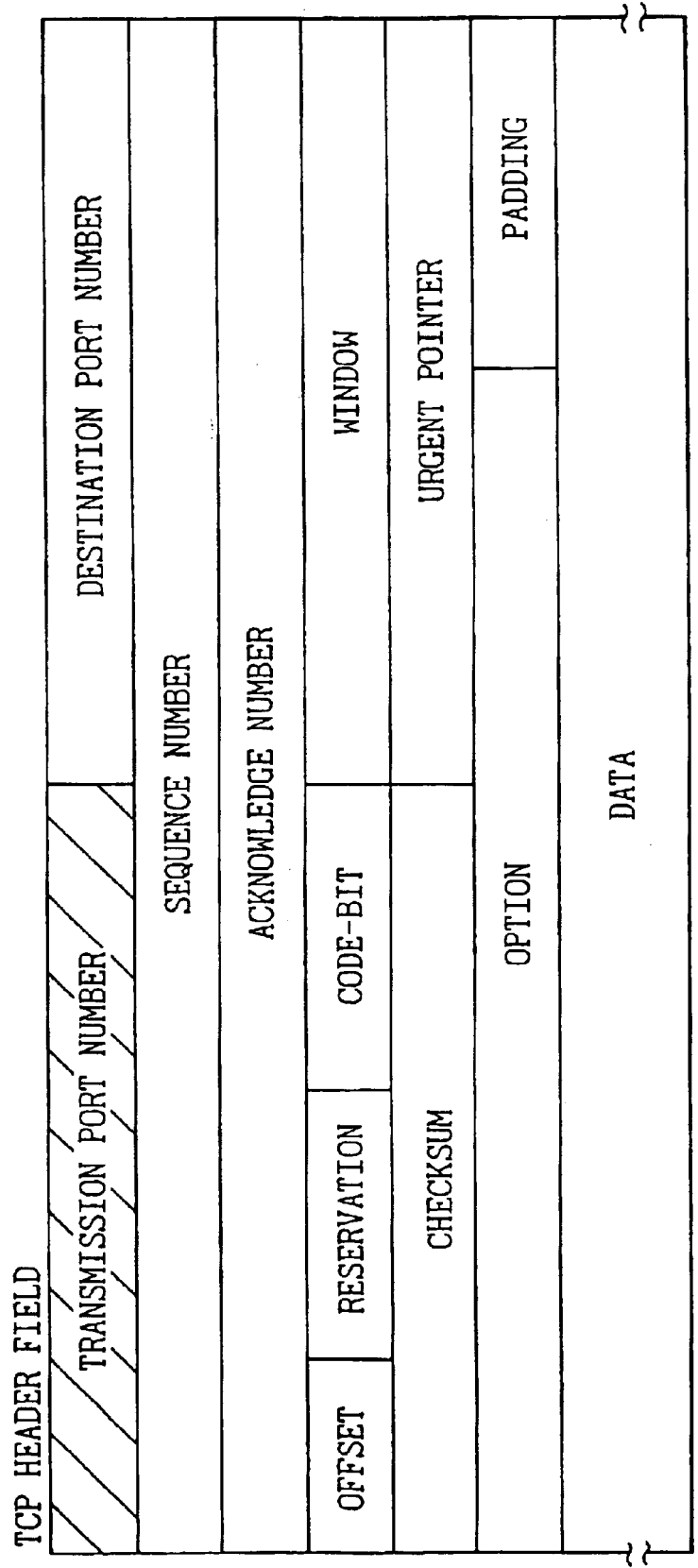
FIG. 10 is a view of a detailed example of a TCP header field.

FIG. 9 is a view of a detailed example of an IP header field,

FIG. 10 is a view of a detailed example of a TCP header field, and

Figure 11:
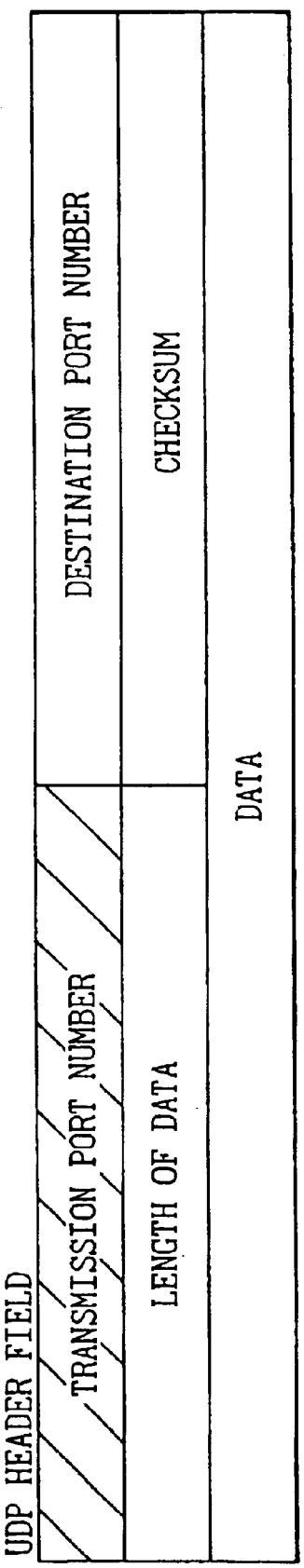
FIG. 11 is a view of a detailed example of an UDP header field.

FIG. 11 is a view of a detailed example of a UDP header field.

In FIGS. 9 to 11, the leftward hatching shows information elements particularly useful for discrimination (refer to step S24 of FIG. 5) by the discrimination unit 41 (FIG. 4) among the above-mentioned parameters. By seeing these, it can be discriminated whether or not the input packet is a voice call packet.

On the other hand, the rightward hatching shows parameters usable in the analysis by the analyzing unit 42 (FIG. 4) among the parameters. By viewing the packet length ("total length") thereof, it can be analyzed if the input packet is a voice call packet. Then, the information element, IP source address, TCP/IP, . . . , etc. obtained from the header of the related voice call packet can be registered in the memory unit 24. The total length of this is for example 80 bytes in the case of a voice call packet.

FIG. 12 is a view of the motion and processing of a packet in FIG. 4.

In the figure, (1) to (5) indicate the flow of the processing. Further, for simplification, only three packets A, B, and C are shown.

First, the discrimination unit 41 views the IP source address/port number/TOS value etc. of the IP packet input to the LAN control unit 21 and discriminates whether or not the packet is a voice call packet.

For example, it refers to the parameters from the memory unit 24 and compares them to decide if a packet is a voice call packet. At this time, if the parameter has been already registered in the memory unit 24, no processing is carried out, but if it is a new voice call packet, the packet length is examined by the analyzing unit 42 and the IP source address/port number/TOS value thereof are registered and stored in the memory unit 24.

Looking at the transmission path band managing unit 43 of FIG. 12, it is necessary to store the routing information indicating for example the relationships between the IP address etc. and a destination of transmission in advance ("routing information of FIG. 4) in the memory unit 24.

Further, the capacity of the field band of the voice call packet is uniquely determined depending on the compression method etc., therefore when a routing table is formed in advance by utilizing this, by also including in that table information indicating how much band is required from the viewpoint of the voice call, the required band of one voice call is determined. In the case of voice communication, the band used by the transmission path can be determined by the number of packets. Further, in the case of data communication, the band used by the transmission path is found by measuring the throughput during communication.

With the above configuration, a communication sequence realized in the integrated network shown in FIG. 3 becomes as shown in FIG. 13.

FIG. 13 is a view of the communication sequence realized in FIG. 3.

In the figure, the sequence when "communication is allowed" is shown in the upper half, while the sequence when "communication is not allowed" is shown in the lower half.

When signaling (call origination) is generated from the branch line system 16 through the PBX #a1, the GW #1 discriminates a voice call packet and decides whether or not it can be carried over the transmission path. When the result of the decision is that it can be carried (band OK), the signaling indicating this fact is returned to the PBX #a1 (response). Together with this, signaling (call origination) is sent into the opposing PBX #b10. When the opposing side receives the call, the signaling indicating that (response) is returned to the PBX #a1 as an RBT (Ring Back Tone). Here, the voice communication is commenced. In the conversation at this time, a real-time characteristic and a constant quality of speech are achieved.

In the latter half of the figure, a decision that the packet cannot be carried over the transmission path is made, and a BT (Busy Tone) indicating that the band cannot be used (NG) is given as the signaling (response) to the related user. The user calls again after congestion of the traffic ends.

As explained above, according to the present invention, when traffic is congested, it is possible to prevent an inferior speech state where the real-time characteristic and the constant quality of speech are lost from the start of the communication. Accordingly, a pleasant speech service can be provided to the end user of the IP network. Further, if necessary, it is possible for the gateway to detect when an inferior speech state has ended and automatically restart the reserved call origination operation.

While the invention has been described with reference to specific embodiment chosen for purpose of illustration, it should be apparent that numerous modifications could be made thereto by those skilled in the art without departing from the basic concept and scope of the invention.

What is claimed is:

1. A method of management and control of voice calls in an integrated voice and data service network, comprising a first step of discriminating whether or not a packet input to a first gateway in said integrated network is a voice call packet, a second step of deciding, when the packet is discriminated as a voice call packet at said first step, whether or not the related voice call packet can be carried over a transmission path based on both an available band of the transmission path to an opposing second gateway and a required band of the related voice call packet, wherein said second step comprises a step of first deciding whether or not signaling information can be carried over said transmission path based on the required band of the voice call packet, discriminated by said first step, carrying the signaling information and a step, when it is decided it can be carried, of subsequently deciding whether or not voice information can be carried over said transmission path based on the required band of the voice call packets carrying the voice information; and a third step of transferring the related voice call packet to said second gateway only when it is decided that it can be carried.

2. A method of management and control of voice calls as set forth in claim 1, wherein said first or second step is executed by referring to predetermined parameters held in said first gateway.

3. A method of management and control of voice calls as set forth in claim 2, wherein
said parameters include at least one of an IP source address, TCP/IP, RTP, UDP port numbers, and a TOS value of the packet input to said first gateway, and said first step is executed based on the related parameters.

4. A method of management and control of voice calls as set forth in claim 2, wherein said parameter is communication throughout information of the related voice call packet, and said second step is executed based on the parameter.

5. A method of management and control of voice calls as set forth in claim 2, wherein said parameter when executing said first step, is input into and held at said first gateway in advance.

6. A method of management and control of voice calls as set forth in claim 2, wherein said parameter, when executing said first step, is determined by analyzing an information element of the voice call packet when said voice call packet passes said first gateway and this is stored and held in said first gateway.

7. A method of management and control of voice calls as set forth in claim 6, wherein said information element is a packet length of the voice call packet, where if it is detected that the packet has a predetermined packet length, the above information element is added to said stored parameters.

8. A method of management and control of voice calls as set forth in claim 1, wherein the decision at said second step is one of whether to permit passage of said voice call packet to said transmission path, to restrict passage, or to wait for permission for passage.

9. A method of management and control of voice calls as set forth in claim 8, further comprising a step of reserving communication wherein, when the decision at said second step is to wait for permission for passage to said transmission path, the communication is reserved and the voice call packet is transmitted simultaneously with the issuance of the permission for passage.

10. A gateway in an integrated voice and data service network, comprising
a discriminating function unit for discriminating whether or not a packet input to said gateway is a voice call packet and
a deciding function unit for deciding, when said discriminating function unit discriminates the packet as a voice call packet, whether or not the voice call packet can be carried over a transmission path based on both an available band of the transmission path to opposing another gateway and the required band of the related voice call packet, wherein said deciding function unit comprises a function unit first deciding whether or not signaling information can be carried over said transmission path based on the required band of the voice call packet, discriminated by said discriminating function unit, carrying the signaling information and a function unit, when it is decided it can be carried, subsequently deciding whether or not voice information can be carried over said transmission path based on the required band of the voice call rackets carrying the voice information.

11. A gateway as set forth in claim 10, wherein provision is made of a memory means for holding predetermined parameters referred to for the discrimination by said discriminating function unit or the decision by said deciding function unit.

12. A gateway as set forth in claim 11, wherein said discriminating function unit includes an analyzing unit for finding said parameter for discrimination by analyzing an information element of a voice call packet when a voice call packet passes through the gateway and storing and holding the same in said memory means.

13. A gateway as set forth in claim 11, further provided with an external interface unit for inputting said parameters used when executing said discrimination in advance for holding in said memory means.

* * * * *